United States Patent [19]

Sawyer et al.

[11] Patent Number: 5,236,051

[45] Date of Patent: Aug. 17, 1993

[54] PLASTIC SHEET TAKE-UP IMPLEMENT

[75] Inventors: Alan G. Sawyer, 6346 Beulah Church Rd., Liberty, N.C. 27298; Ralph L. Roberson, 3300 Alamance Church Rd., Julian, N.C. 27283

[73] Assignees: Alan G. Sawyer, Liberty; Ralph L. Roberson, Julian, both of N.C.

[21] Appl. No.: 821,081

[22] Filed: Jan. 16, 1992

[51] Int. Cl.$^5$ ........................ A01B 49/00; A01G 7/00
[52] U.S. Cl. ..................................... 172/438; 47/9 M; 171/45; 171/53
[58] Field of Search ............... 172/19, 20, 438; 171/1, 171/53, 45; 47/9, 9 M, 9 P; 111/144, 145, 146

[56] References Cited

U.S. PATENT DOCUMENTS

| | | | |
|---|---|---|---|
| 3,175,621 | 3/1965 | Kappelmann et al. | 171/53 |
| 3,181,455 | 5/1965 | Gouker et al. | 47/9 M X |
| 4,796,711 | 1/1989 | Chrysler | 47/9 M X |
| 5,063,707 | 11/1991 | Antill et al. | 47/9 M |

FOREIGN PATENT DOCUMENTS

| | | | |
|---|---|---|---|
| 2399796 | 3/1979 | France | 47/9 M |
| 2562382 | 10/1985 | France | 47/9 M |
| 990100 | 1/1983 | U.S.S.R. | 172/19 |
| 1535462 | 1/1990 | U.S.S.R. | 47/9 M |
| 2239154 | 6/1991 | United Kingdom | 47/9 M |

Primary Examiner—Dennis L. Taylor
Assistant Examiner—Spencer Warnick
Attorney, Agent, or Firm—Rhodes, Coats and Bennett

[57] ABSTRACT

An agricultural implement for automatically taking up plastic sheeting and drip tape onto cylindrical drums. In the preferred embodiment, the device is designed to be mounted onto the back of a tractor or the like by means of a three point hitch. The device includes a frame having a first take-up means for receiving the plastic sheeting, a drive means connected to a first cylindrical drum and powered by the tractor, and a by-pass valve located between the drive means and the tractor for controlling the speed of the first take-up means. The first take-up means includes a spiral roller for preventing the plastic sheeting from bunching up. The present invention also includes a second take-up means for receiving the drip tape onto a second cylindrical drum. The second take-up means is preferably powered off of the first drive means. A control means is located between the second take-up means and the drive means for controlling the speed at which the drip tape roll is rotated. Depending on the degree of tension or slack in the drip tape as it is taken up, the speed at which the second take-up means is either decreased or increased, respectively. This synchronizes the take-up of the drip tape with the take-up of the plastic sheeting, thereby allowing both to be taken up in a single pass.

14 Claims, 2 Drawing Sheets

PLASTIC SHEET TAKE-UP IMPLEMENT

BACKGROUND OF THE INVENTION (1) Field of the Invention

The present invention relates generally to agricultural implements and, more particularly, to an agricultural implement for automatically retrieving plastic sheeting from the surface of a field.

(2) Description of the Prior Art

In the last few years, there has been developed a new method of farming which provides exceptional control of the water and fertilizer requirements for the plants and minimizes the need for weed control. Yields of three times what would normally be expected are possible using this technique.

Generally this method includes preparing seed beds approximately 32 inches in width with a shaper or other conventional means. A generally flat hollow tube having a plurality of openings along its length is then laid down along the center of each seed bed row. This hollow tube is called a drip tape. Each row of drip tape is connected to another row and to a source of premixed water and fertilizer. A sheet of plastic is laid over the drip tape and bed at the same time the drip tape is laid down to keep out the weeds and conserve water by reducing evaporation. Finally, a tractor drawn planter goes down each row and plants individual plants right through the plastic sheeting and generally adjacent to the drip tape. While more expensive than conventional farming techniques, the high yield associated with the drip tape process justifies its extra cost, particularly for fruits and vegetables.

During the growing season, the water and fertilizer requirements are carefully controlled and the plastic sheeting prevents growth of weeds. At the end of the growing season and the harvest, the plastic sheeting and drip tape must be rolled up for disposal and/or recycling.

By the end of the growing season, the exposed portion of the plastic sheeting has deteriorated by exposure to the sun and elements and has become brittle and weak. As a result, it has been common practice to employ farm labor to manually remove the dirt from the edges of the plastic sheeting, roll the sheeting into bundles and retrieve the drip tape. This cleanup labor requirement offsets some of the labor and chemical savings associated with this farming technique. Accordingly, it would be desirable to have an automatic means for retrieving the plastic sheeting and drip tape from the surface of the field without the need for intervention of manual labor.

There have been some attempts for automating the removal of the dirt on the edges of the plastic sheeting. One such device manufactured by New Holland of New Holland, Mich. However, this device was not operable to retrieve the plastic sheeting from the surface of the field or to retrieve the plastic sheeting and the drip tape simultaneously from the surface of the field.

Thus, there remains a need for an agricultural implement which is operable to automatically and simultaneously retrieve the plastic sheeting and drip tape from the surface of a field without the need for manual intervention.

SUMMARY OF THE INVENTION

The present invention is directed to an agricultural implement for automatically taking up plastic sheeting and drip tape onto cylindrical drums. In the preferred embodiment, the device is designed to be mounted onto the back of a tractor or the like by means of a three point hitch. The device includes a frame having a first take-up means for receiving the plastic sheeting, a drive means connected to a first cylindrical drum and powered by the tractor, and a by-pass valve located between the drive means and the tractor for controlling the speed of the first take-up means. The first take-up means includes a spiral roller for preventing the plastic sheeting from bunching up. The present invention also includes a second take-up means for receiving the drip tape onto a second cylindrical drum. The second take-up means is preferably powered off of the first drive means. A control means is located between the second take-up means and the drive means for controlling the speed at which the drip tape roll is rotated. Depending on the degree of tension or slack in the drip tape as it is taken up, the speed of the second take-up means is either decreased or increased, respectively. This synchronizes the take-up of the drip tape with the take-up of the plastic sheeting, thereby allowing both to be taken up in a single pass.

Accordingly, one aspect of the present invention is to provide an agricultural implement for automatically retrieving plastic sheeting from the surface of a field. The implement includes: (a) a frame adapted to be mounted to a tractor or the like; and (b) take-up means mounted to the frame, the take-up means including: (i) a drum rotatably mounted to the frame for receiving plastic sheeting; (ii) drive means attached to the drum; and (iii) control means connected to the drive means for rotating the drum at a predetermined speed.

Another aspect of the present invention is to provide a take-up mechanism for an agricultural implement, having a frame adapted to be mounted to a tractor or the like, for simultaneously retrieving plastic sheeting and drip tape from the surface of a field. The mechanism includes: (a) a first take-up means mounted to the frame, the first take-up means including: (i) a first drum rotatably mounted to the frame for receiving the plastic sheeting; (ii) drive means attached to the first drum; and (iii), control means connected to the drive means for rotating the first drum at a predetermined speed; (b) a second take-up means mounted to the frame, the second take-up means including: (i) a second drum rotatably mounted to the frame and (ii) means for connecting the second drum to the drive means of the first take-up means; and (c) control means attached between the second take-up means and the drive means of the first take-up means for controlling the speed of take-up of the second take-up means whereby the first and second take-up means are operable to simultaneously retrieve both the plastic sheeting and the drip tape.

Still another aspect of the present invention is to provide an agricultural implement for automatically retrieving plastic sheeting from the surface of a field. The implement includes: (a) a frame adapted to be mounted to a tractor or the like; (b) a pair of foot pieces mounted in spaced apart relationship to the frame and operable to lift and remove accumulated dirt from the edges of the plastic sheeting; (c) a first take-up means mounted to the frame, the first take-up means including: (i) a first drum rotatably mounted to the frame for receiving the plastic sheeting; (ii) drive means attached to the first drum; and (iii) first control means connected to the drive means for rotating the first drum at a predetermined speed; (d) a second take-up means mounted to the frame, the second take-up means including: (i) a second drum rotatably mounted to the frame and (ii) means for connecting the second drum to the drive means of the first take-up means; and (e) second control means attached between the second take-up means and the drive means of the first take-up means for controlling the speed of take-up of the second take-up means whereby the first and second take-up means are operable to simultaneously retrieve both the plastic sheeting and the drip tape.

These and other aspects of the present invention will become apparent to those skilled in the art after a reading of the following description of the preferred embodiment when considered with the drawings.

DESCRIPTION OF THE PREFERRED EMBODIMENTS

Figure 1:
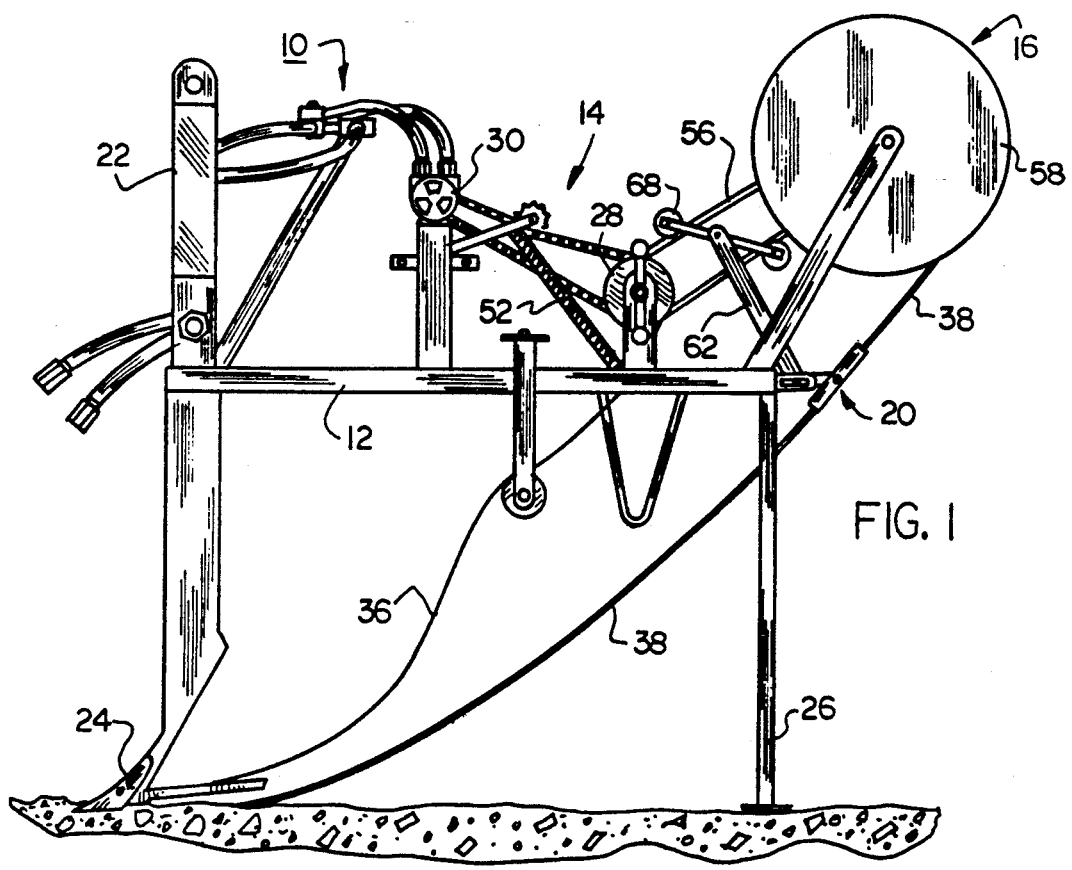
FIG. 1 is a side view of an agricultural implement construct according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen is FIG. 1, an agricultural implement, generally designated 10, is shown constructed according to the present invention. The implement 10 includes four major sub-assemblies: a frame 12; a first take-up means 14; a second take-up means 16; and a control means 20.

Frame 12 includes a conventional three-point hitch 22 attached to one end of the frame for attachment to a tractor or the like. Adjacent to three-point hitch 22 are a pair of rigidly mounted points 24 mounted in spaced apart relationship to one another and operable to lift and remove accumulated dirt from the edges of the plastic sheeting. Rear support posts 26 are pivotally attached to the trailing edge of frame 12 and permit support of the device 10 when not attached to the tractor.

The first take-up means 14 includes a first drum 28 rotatably attached to frame 12. Drum 28 is rotated by drive 30 which in the preferred embodiment is a hydraulically powered motor. A first control means 32 is connected between the source of hydraulic fluid from the tractor and drive 30 for controlling the speed of drive 30. Also in the preferred embodiment, a roller 34 is mounted adjacent to drum 28 for lifting plastic sheeting 36 prior to sheeting being wound upon drum 28. Drip tape 38 is received by a control means 20 which will be discussed in more detail for controlling the speed of the second take-up means 16.

Figure 2:
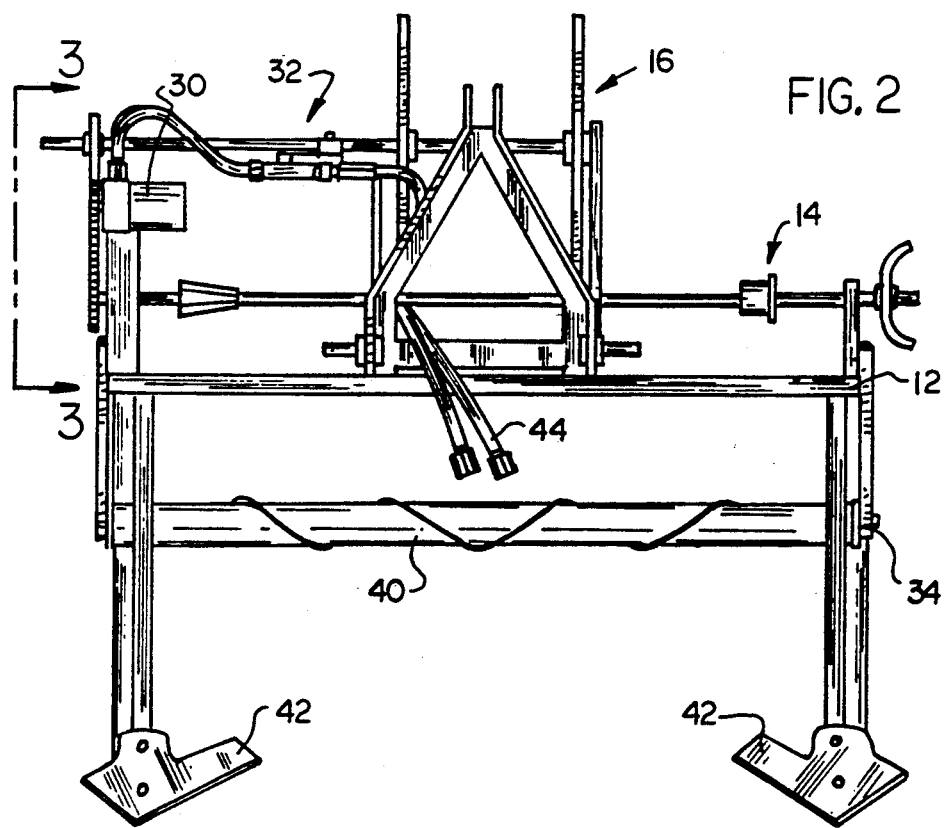
FIG. 2 is a front view of the implement shown in FIG. 1.

Turning to FIG. 2, there is shown a front view of the implement shown in FIG. 1. As can be seen, roller 34 also preferably includes a pair of opposed helixes 40 welded onto the surface of the roller. In operation, plastic sheeting 36 is passed over the surface of roller 34 prior to being wound upon drum 28. The contact of the surface of the plastic sheeting 36 with the helixes 40 causes the sheeting to be stretched edgewise and prevents the sheeting from bunching up as it is wound onto drum 28. As can also be seen in FIG. 2, foot pieces 24 include inwardly extending edges 42 which are mounted in spaced apart relationship to one another and are operable to lift and remove accumulated dirt from the edges of the plastic sheeting. Finally, hydraulic lines 44 are connected to drive 30 and first control means 32.

Figure 3:
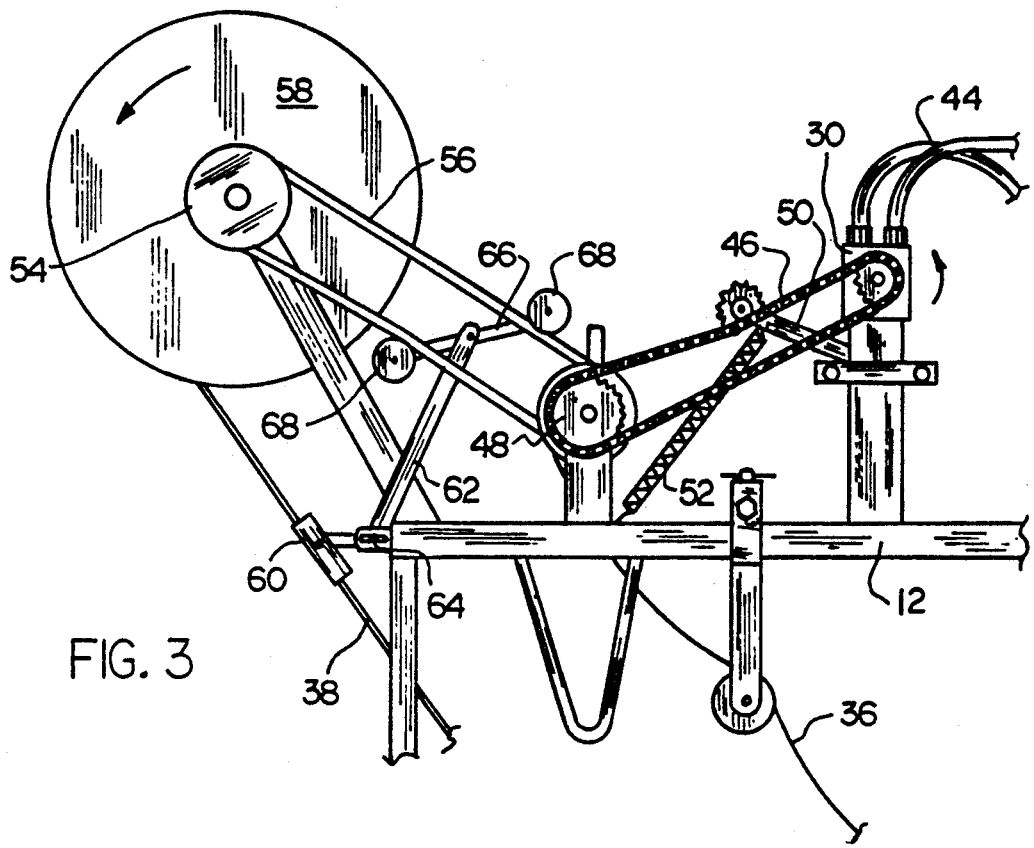
FIG. 3 is an enlarged partial side view of the implement shown in FIG. 2 taken along lines 3—3.

Details of the second take-up means 16 and control means 20 can best be seen in FIG. 3 which is an enlarged partial side view of the implement shown in FIG. 2 but taken along lines 3—3. Chain drive 46 is connected between drive 30 and a sprocket/pulley assembly 48 connected to one end of drum 28. An idler arm 50 and spring 52 remove the slack from chain drive 46. A V-belt 56 is connected from sprocket/pulley assembly 48 to a pulley 54 connected to one end of drum 58.

Control means 20 includes a tubular guide 60 having a rectangular cross-section attached to a first lever 62. First lever 62 is pivotally mounted to frame 12 at pivot point 64. A second lever arm 66 is attached to the other end of first lever 62. A pair of pulleys 68 are rotatably mounted to the ends of second lever arm 66 and aligned with V-belt 56.

In operation, control means 20 decreases the tension on belt 56 in response to increasing tension on tape 38 which causes lever arm 62 to pivot counterclockwise. As a result, the take-up speed of the take-up means for retrieving the drip tape 38 remains proportional to the take-up speed of the take-up means taking up the plastic sheeting. Thus, it is only necessary for the operator to control the speed of the tractor and adjust control means 32 to control the first take-up means. The second take-up means is then automatically controlled in response to the movement of the tractor and the tension of the drip tape 38.

Figure 4:
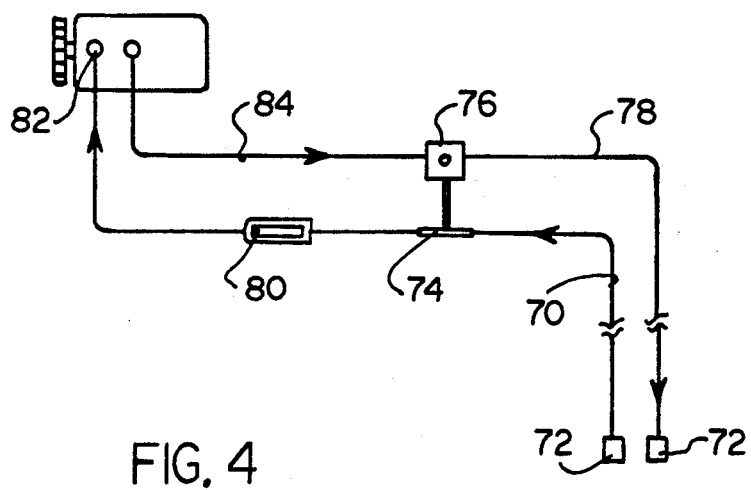
FIG. 4 is a schematic representation of the control system for the sheeting take-up mechanism.

Finally, turning to FIG. 4, there is shown a schematic representation of the control system 32 for the sheeting take-up mechanism 14. High pressure line 70 is connected by means of releasable coupling 72 to a source of hydraulic pressure usually supplied by the tractor. High pressure line 70 is connected to a tee 74 which, in turn, is connected to an adjustable pressure relief valve 76. A return line 78 is connected from pressure relief valve 76 back to the tractor by means of a second coupling 72. A ball valve 80 is connected downstream of tee 74 and is connected to input 82 of drive 30. A second return line 84 is connected from drive 30 to return line 78.

In operation, bypass valve 76 is adjusted to limit the pressure of hydraulic fluid to drive 30. This produces a generally course adjustment to the motor speed. Ball valve 80 located between the motor 30 and the bypass valve 76 is then used by the operator to control the flow rate of hydraulic fluid to drive 30 allowing the operator to control the speed of drive means 30. As discussed above, the take-up speed of the take-up means for retrieving the drip tape 38 remains proportional to the take-up speed of the take-up means taking up the plastic sheeting. Thus, it is only necessary for the operator to control the speed of the tractor and adjust control means 32 to control the first take-up means.

Certain modifications and improvements will occur to those skilled in the art upon reading of the foregoing description. By way of example, various types of drive means could be employed such as power-take-off, electric motor or ground wheel drives. Also, for some applications in which the plants remain in the plastic, it may be necessary to split the plastic during take-up to clear the plants. It should be understood that all such modifications and improvements have been deleted herein for the sake of conciseness and readability but are properly within the scope of the following claims.

We claim:

1. An agricultural implement for automatically retrieving plastic sheeting from the surface of a field, said implement comprising:
   (a) a frame adapted to be mounted to a tractor;
   (b) take-up means mounted to said frame, said take-up means including: (i) a drum rotatably mounted to said frame for receiving the plastic sheeting; (ii) drive means attached to said drum; and (iii) control means connected to said drive means for rotating said drum at a predetermined speed; and
   (c) a roller located adjacent to said drum for lifting the plastic sheeting form the surface of the field, wherein said roller located adjacent to said drum for guiding the plastic sheeting onto said drum includes a pair of opposed helixes affixed to the surface of said roller, said helixes being operable to stretch the plastic sheeting prior to the plastic sheeting being received by said drum.

2. The apparatus according to claim 1, further including a pair of foot pieces having inwardly extending edges mounted in spaced apart relationship to said frame and operable to lift and remove accumulated dirt from the edges of said plastic sheeting.

3. The apparatus according to claim 1, wherein said drive means is a hydraulic motor and a source of hydraulic fluid under pressure and said control means includes a by-pass valve connected between said motor and said source of hydraulic fluid for limiting the pressure of hydraulic fluid to said motor.

4. The apparatus according to claim 3, further including a ball valve located between said motor and said by-pass valve for controlling the flow rate of hydraulic fluid to said motor, thereby controlling the speed of said motor.

5. A take-up mechanism for an agricultural implement, having a frame adapted to be mounted to a tractor, for simultaneously retrieving plastic sheeting and drip tape from the surface of a field, said mechanism comprising:
   (a) a first take-up means mounted to said frame, said first take-up means including: (i) a first drum rotatably mounted to said frame for receiving the plastic sheeting; (ii) drive means attached to said first drum; and (iii) control means connected to said drive means for rotating said first drum at a predetermined speed;
   (b) a second take-up means mounted to said frame, said second take-up means including: (i) a second drum rotatably mounted to said frame and (ii) means for connecting said second drum to said drive means of said first take-up means; and
   (c) control means attached between said second take-up means and said drive means of said first take-up means for controlling the speed of take-up of said second take-up means whereby said first and second take-up means are operable to simultaneously retrieve both the plastic sheeting and the drip tape.

6. The apparatus according to claim 5, wherein said drive means includes a first pulley attached to said drive means, a second pulley attached to said second drum, and a flexible belt connecting said first and second pulleys.

7. The apparatus according to claim 6, wherein said control means includes means for decreasing the tension of said flexible belt in response to an increase in the tension of the drip tape, thereby decreasing the speed of said second drum.

8. An agricultural implement for automatically retrieving plastic sheeting from the surface of a field, said implement comprising:
   (a) a frame adapted to be mounted to a tractor;
   (b) a pair of foot pieces mounted in spaced apart relationship to said frame and operable to lift and remove accumulated dirt from the edges of said plastic sheeting;
   (c) a first take-up means mounted to said frame, said first take-up means including: (i) a first drum rotatably mounted to said frame for receiving the plastic sheeting; (ii) drive means attached to said first drum; and (iii) first control means connected to said drive means for rotating said first drum at a predetermined speed;
   (d) a second take-up means mounted to said frame, said second take-up means including: (i) a second drum rotatably mounted to said frame and (ii) means for connecting said second drum to said drive means of said first take-up means; and
   (e) second control means attached between said second take-up means and said drive means of said first take-up means for controlling the speed of take-up of said second take-up means whereby said first and second take-up means are operable to simultaneously retrieve both the plastic sheeting and the drip tape.

9. The apparatus according to claim 8, wherein said drive means is a hydraulic motor and a source of hydraulic fluid under pressure and said control means includes a by-pass valve connected between said motor and said source of hydraulic fluid for limiting the pressure of hydraulic fluid to said motor.

10. The apparatus according to claim 9, further including a ball valve located between said motor and said by-pass valve for controlling the flow rate of hydraulic fluid to said motor, thereby controlling the speed of said motor.

11. The apparatus according to claim 8, further including a roller located adjacent to said drum for lifting the plastic sheeting from the surface of the field.

12. The apparatus according to claim 11, wherein said roller located adjacent to said drum for guiding the plastic sheeting onto said drum includes a pair of opposed helixes affixed to the surface of said roller, said helixes being operable to stretch the plastic sheeting prior to the plastic sheeting being received by said drum.

13. The apparatus according to claim 8, wherein said drive means includes a first pulley attached to said drive means, a second pulley attached to said second drum, and a flexible belt connecting said first and second pulleys.

14. The apparatus according to claim 13, wherein said control means includes means for decreasing the tension of said flexible belt in response to an increase in the tension of the drip tape, thereby decreasing the speed of said second drum.

* * * * *